United States Patent
Han et al.

(10) Patent No.: US 12,469,557 B2
(45) Date of Patent: Nov. 11, 2025

(54) SEMICONDUCTOR DEVICE AND OPERATING METHOD FOR CONTROLLING DRIVING DIRECTION OF WORD LINE

(71) Applicant: SK hynix Inc., Icheon-si (KR)

(72) Inventors: Chang Hyun Han, Icheon-si (KR); Moon Soo Sung, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 201 days.

(21) Appl. No.: 18/323,950

(22) Filed: May 25, 2023

(65) Prior Publication Data

US 2024/0265970 A1 Aug. 8, 2024

(30) Foreign Application Priority Data

Feb. 2, 2023 (KR) .......................... 10-2023-0014039

(51) Int. Cl.
*G11C 16/08* (2006.01)
(52) U.S. Cl.
CPC .................................. *G11C 16/08* (2013.01)
(58) Field of Classification Search
CPC ......... G11C 16/08; G11C 16/10; G11C 16/30; G11C 8/08; G11C 16/0483
See application file for complete search history.

(56) References Cited

U.S. PATENT DOCUMENTS

| 11,315,636 | B2 | 4/2022 | Liang et al. | |
|---|---|---|---|---|
| 2009/0097316 | A1* | 4/2009 | Lee | H10B 41/30 365/185.11 |
| 2012/0300547 | A1* | 11/2012 | Choi | H10B 43/30 257/E21.409 |
| 2019/0272880 | A1* | 9/2019 | Lee | H10B 43/27 |
| 2021/0057028 | A1* | 2/2021 | Hosomura | G11C 8/14 |

FOREIGN PATENT DOCUMENTS

KR 101771619 B1 8/2017

* cited by examiner

*Primary Examiner* — Mohammed A Bashar
(74) *Attorney, Agent, or Firm* — WILLIAM PARK AND ASSOCIATES LTD.

(57) ABSTRACT

A semiconductor device may include a memory cell array including a first memory string that is connected to a first drain selection line and a second memory string that is connected to a second drain selection line, a control circuit configured to generate a first switch control signal and a second switch control signal based on an address signal, a first switch disposed in a direction corresponding to the first drain selection line and configured to connect a global word line with a local word line or disconnect the global word line from the local word line based on the first switch control signal, and a second switch disposed in a direction corresponding to the second drain selection line and configured to connect the global word line with the local word line or disconnect the global word line from the local word line based on the second switch control signal.

16 Claims, 8 Drawing Sheets

SEMICONDUCTOR DEVICE AND OPERATING METHOD FOR CONTROLLING DRIVING DIRECTION OF WORD LINE

CROSS-REFERENCE TO RELATED APPLICATION

This application claims priority under 35 U.S.C. § 119(a) to Korean Patent Application No. 10-2023-0014039 filed on Feb. 2, 2023, in the Korean Intellectual Property Office, which is incorporated herein by reference in its entirety.

BACKGROUND

1. Technical Field

Embodiments relate to an integrated circuit technology and, more particularly, to a semiconductor device and operating method for controlling a driving direction of a word line.

2. Related Art

Recently, as electronic devices are smaller, have low power consumption and high performance, and are diversified, a semiconductor device capable of storing information is required for various electronic devices, such as computers and portable communication devices. The semiconductor device may basically be divided into a volatile memory device and a nonvolatile memory device. The volatile memory device has a fast data processing speed but has a disadvantage in that the volatile memory device needs to be continuously supplied with power in order to maintain data that has been stored in the volatile memory device. The nonvolatile memory device does not need to be continuously supplied with power in order to maintain data that has been stored in the nonvolatile memory device but has a disadvantage in that the nonvolatile memory device has a slow data processing speed.

In order to deploy more memory cells in the same area of the nonvolatile memory device, a technology for forming a plurality of memory cells by cutting one hole is being developed.

In the technology for forming a plurality of memory cells by cutting one hole, however, interference between the memory cells emerges as a problem, as the distance between the memory cells is narrowed.

SUMMARY

In an embodiment, a semiconductor device may include a memory cell array including a first memory string that is connected to a first drain selection line and a second memory string that is connected to a second drain selection line, a control circuit configured to generate a first switch control signal and a second switch control signal based on an address signal, a first switch disposed in a direction corresponding to the first drain selection line and configured to connect a global word line with a local word line or disconnect the global word line from the local word line based on the first switch control signal, and a second switch disposed in a direction corresponding to the second drain selection line and configured to connect the global word line with the local word line or disconnect the global word line from the local word line based on the second switch control signal.

In an embodiment, a semiconductor device may include a first line driving circuit configured to drive a word line based on a first driving address signal, a second line driving circuit configured to drive the word line based on a second driving address signal, a first memory string connected to a first drain selection line and the word line, a second memory string connected to a second drain selection line and the word line, and a control circuit configured to generate the first driving address signal and the second driving address signal based on an address signal.

In an embodiment, an operating method of a semiconductor device may include decoding an address signal, determining a driving direction, among a first direction and a second direction, of a drain selection line based on a result of the decoding, and driving an unselected word line in a direction corresponding to the driving direction of the drain selection line.

In an embodiment, a semiconductor device may include a first memory string that is controlled by a plurality of word lines and a first drain selection line that is driven in a first direction, and a second memory string that is controlled by the plurality of word lines and a second drain selection line that is driven in a second direction. When the first memory string is selected, a selected word line, among the plurality of word lines, may be driven in the first direction and the second direction, and an unselected word line, among the plurality of word lines, may be driven in the first direction. When the second memory string is selected, a selected word line, among the plurality of word lines, may be driven in the first direction and the second direction, and an unselected word line, among the plurality of word lines, may be driven in the second direction.

DETAILED DESCRIPTION

Hereinafter, embodiments according to the technical spirit of the present disclosure are described with reference to the accompanying drawings.

Embodiments of the present disclosure may provide a semiconductor device and operating method, which can control a driving direction of a word line.

It is possible to reduce interference between memory cells by controlling driving directions of an unselected word line and a selected word line. Unselected may be defined as not being selected.

Figure 1:
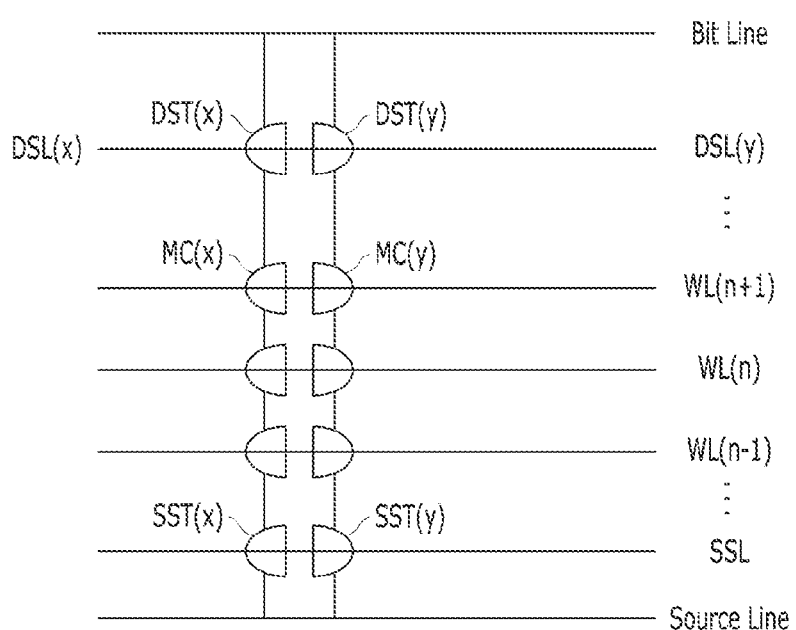
FIG. 1 is a diagram for describing a memory string according to an embodiment of the present disclosure.

FIG. 1 is a diagram for describing a memory string according to an embodiment of the present disclosure.

In general, a memory string may be formed to have a structure in which a drain selection transistor DST, a plurality of memory cells MC, and a source selection transistor SST have been connected in series between a bit line and a source line.

The memory string according to an embodiment of the present disclosure may be constructed as transistors that are formed in two regions by dividing an initial region into two sides in which the transistors will be formed by cutting the region. In this case, transistors (e.g., transistors on the left side of FIG. 1) in one of the divided regions may be indicated with "x". The other transistors (e.g., transistors at the right side of FIG. 1) in the other region of the divided regions may be indicated with "y".

FIG. 1 may be a diagram that describes two memory strings that have been formed by dividing one memory string through a cutting process.

Referring to FIG. 1, a first drain selection transistor DST(x) and a second drain selection transistor DST(y) may be transistors that are divided through a cutting process. A plurality of first memory cells MC(x) and a plurality of second memory cells MC(y) may be memory cells that are divided through the cutting process. A first source selection transistor SST(x) and a second source selection transistor SST(y) may be transistors that are divided through the cutting process.

One memory string may be formed to have a structure in which the first drain selection transistor DST(x), the plurality of first memory cells MC(x), and the first source selection transistor SST(x) have been connected in series between the bit line and the source line.

The other memory string may be formed to have a structure in which the second drain selection transistor DST(y), the plurality of second memory cells MC(y), and the second source selection transistor SST(y) have been connected in series between the bit line and the source line.

In this case, the first drain selection transistor DST(x) may be configured to be controlled by a first drain selection line DSL(x). The second drain selection transistor DST(y) may be configured to be controlled by a second drain selection line DSL(y). The first memory cell MC(x) and the second memory cell MC(y) may be configured to be controlled by one word line WL(n+1). The first source selection transistor SST(x) and the second source selection transistor SST(y) may be configured to be controlled by one source selection line SSL.

The present disclosure relates to a memory string that has been divided into two memory strings through a cutting process as described above but may also be applied to a semiconductor device in which two memory strings that are connected to a word line in common are disposed between a bit line and a source line and in which each memory string is selected by each drain selection transistor.

Figure 2A:
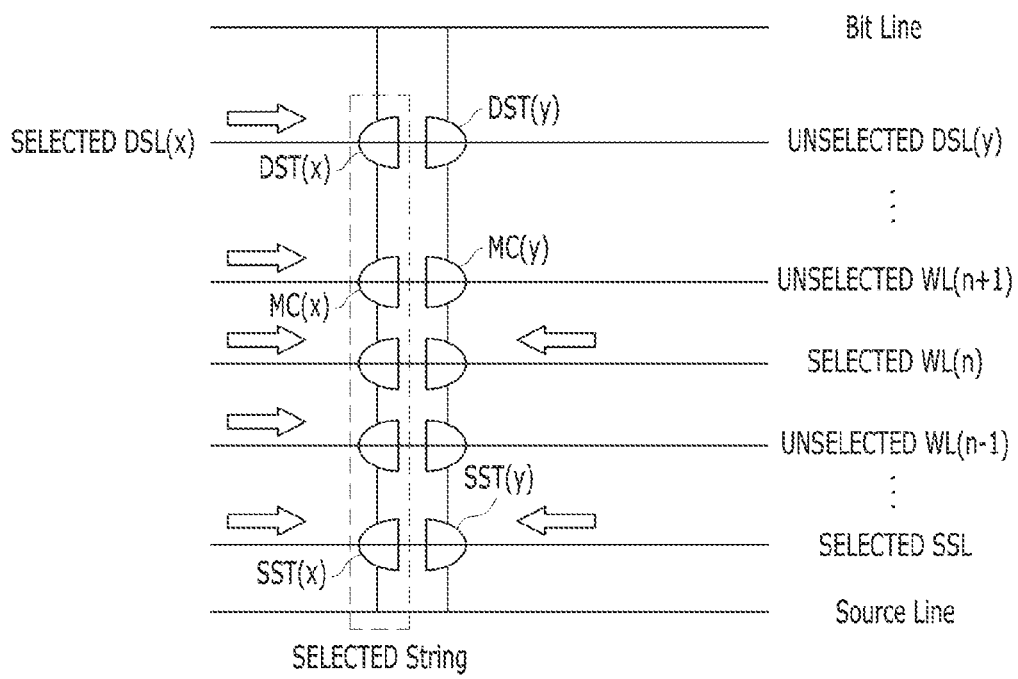
FIGS. 2A and 2B are diagrams for selecting a memory string according to an embodiment of the present disclosure and describing driving directions of lines that are connected to the memory string.
Figure 2B:
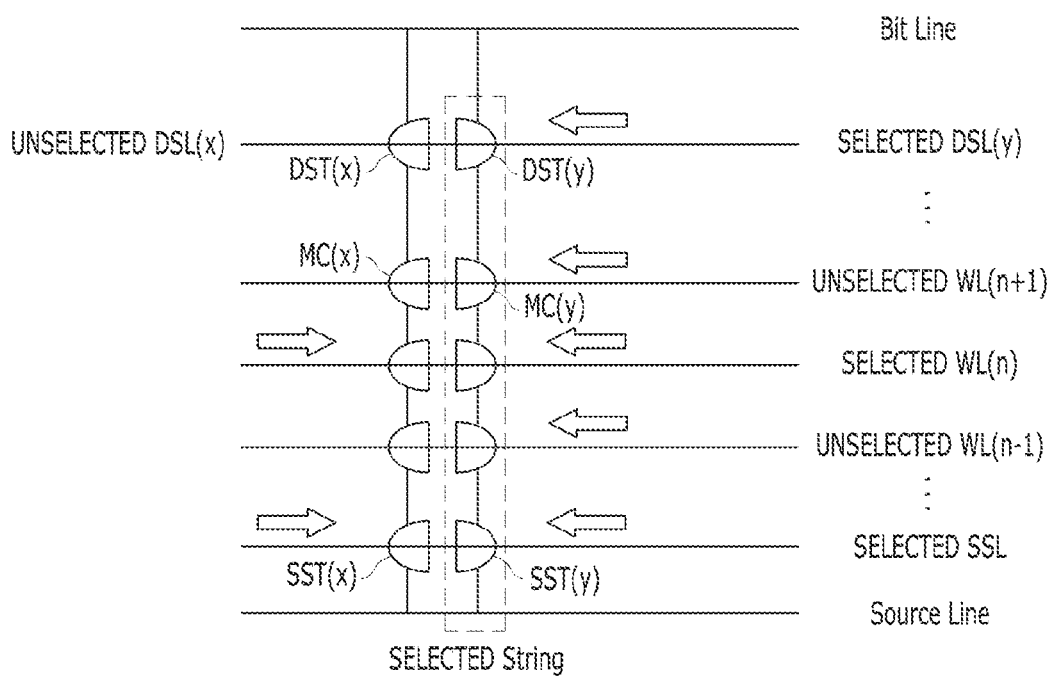

FIGS. 2A and 2B are diagrams for selecting a memory string according to an embodiment of the present disclosure and describing driving directions of lines that are connected to the memory string.

FIG. 2A may be a diagram illustrating that a memory string including a first drain selection transistor DST(x), a plurality of first memory cells MC(x), and a first source selection transistor SST(x) has been selected. Hereinafter, the memory string including the first drain selection transistor DST(x), the plurality of first memory cells MC(x), and the first source selection transistor SST(x) may be named a first memory string.

Referring to FIG. 2A, the first memory string may be selected by the driving of a first drain selection line DSL(x) and a source selection line SSL.

One of the plurality of first memory cells MC(x) that are included in the first memory string may be selected by the driving of a plurality of word lines WL(n+1), WL(n), and WL(n−1) (n being a natural number).

For example, the n-th word line WL(n) may be selected and driven, and the remaining word lines WL(n−1) and WL(n+1) may be unselected and driven. The n-th word line WL(n) that is selected and driven may be driven in a driving direction of the first drain selection line DSL(x) and a driving direction of a second drain selection line DSL(y). The word lines WL(n−1) and WL(n+1) that are unselected and driven may be driven in the driving direction of the first drain selection line DSL(x). In this case, one memory cell MC(x) that is connected to the n-th word line WL(n) that is selected and driven, among the plurality of first memory cells MC(x) that are included in the first memory string, may be selected. Furthermore, the voltage level of the word line that is selected and driven and the voltage level of the word line that is unselected and driven may be different from each other.

FIG. 2B may be a diagram illustrating that a memory string including a second drain selection transistor DST(y), a plurality of second memory cells MC(y), and a second source selection transistor SST(y) has been selected. Hereinafter, the memory string including the second drain selection transistor DST(y), the plurality of second memory cells MC(y), and the second source selection transistor SST(y) may be named a second memory string.

Referring to FIG. 2B, the second memory string may be selected by the driving of the second drain selection line DSL(y) and the source selection line SSL.

One of the plurality of second memory cells MC(y) that are included in the second memory string may be selected by the driving of the plurality of word lines WL(n+1), WL(n), and WL(n−1) (n being a natural number).

For example, the n-th word line WL(n) may be selected and driven, and the remaining word lines WL(n−1) and WL(n+1) may be unselected and driven. The n-th word line WL(n) that is selected and driven may be driven in a driving direction of the second drain selection line DSL(y) and a driving direction of the first drain selection line DSL(x). The word lines WL(n−1) and WL(n+1) that are unselected and driven may be driven in the driving direction of the second drain selection line DSL(y). In this case, one memory cell MC(y) that is connected to the n-th word line WL(n) that is selected and driven, among the plurality of second memory cells MC(y) that are included in the second memory string, may be selected. Furthermore, the voltage level of the word line that is selected and driven and the voltage level of the word line that is unselected and driven may be different from each other.

As described above, the present disclosure can reduce interference between memory cells by unidirectionally driving unselected word lines in the same direction as the direction of a drain selection line that is driven in order to select a memory string. Furthermore, the present disclosure can reduce the program time of a selected memory cell by bidirectionally driving a selected word line regardless of a driving direction of a drain selection line.

A construction of a semiconductor device according to an embodiment of the present disclosure, which can operate as described above, is described.

Figure 3A:
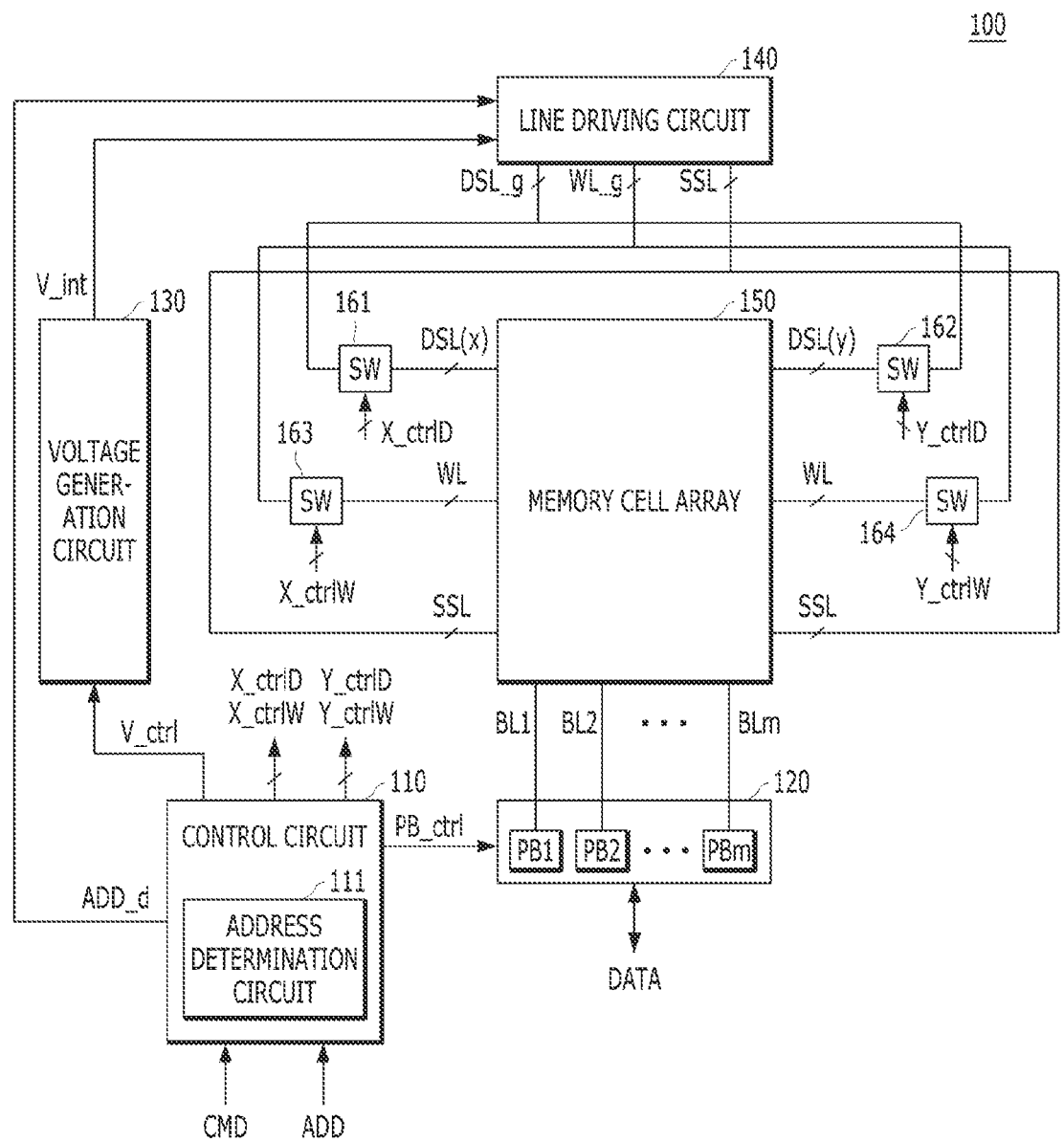
FIGS. 3A and 3B are schematic diagrams for describing a semiconductor device to which a memory string according to an embodiment of the present disclosure has been applied.
Figure 3B:
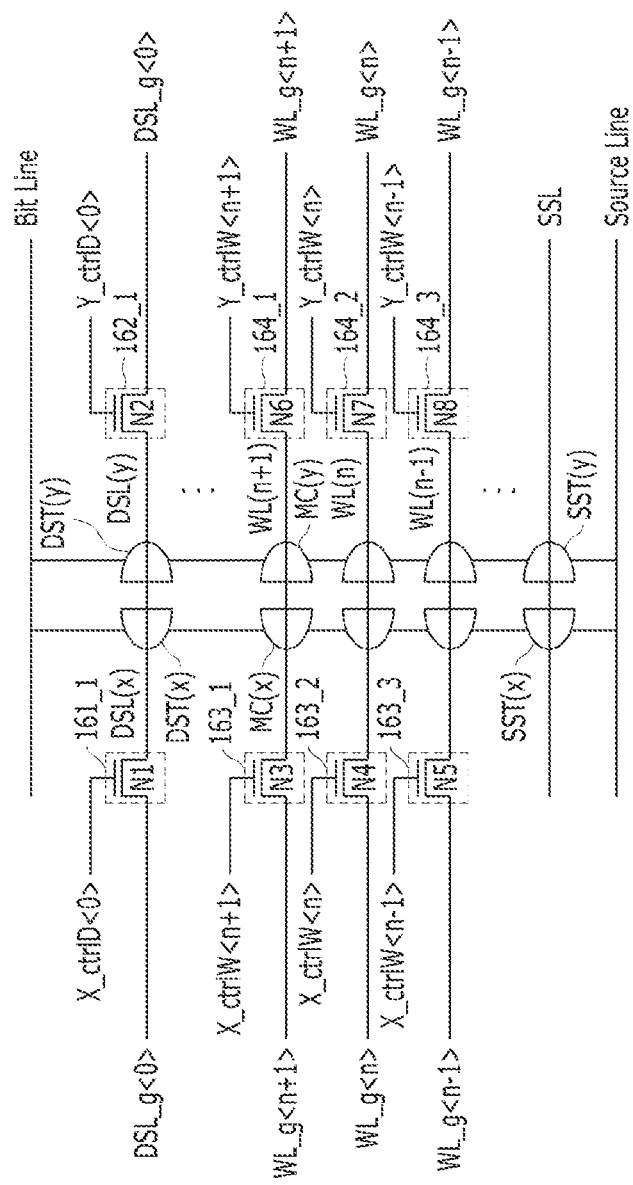

FIGS. 3A and 3B are schematic diagrams for describing a semiconductor device to which a memory string according to an embodiment of the present disclosure has been applied.

Referring to FIG. 3A, a semiconductor device 100 to which a memory string according to an embodiment of the present disclosure has been applied may include a control circuit 110, a page buffer group 120, a voltage generation circuit 130, a line driving circuit 140, a memory cell array 150, and a plurality of switches (SW) 161, 162, 163, and 164.

The control circuit 110 may program data into the memory cell array 150 or may erase data that has been programmed into the memory cell array 150 by controlling the page buffer group 120, the voltage generation circuit 130, the line driving circuit 140, and the plurality of switches 161, 162, 163, and 164.

The control circuit 110 may generate a page buffer control signal PB_ctrl based on a command signal CMD and an address signal ADD that are received from an external device (e.g., a host) and may provide the page buffer control signal PB_ctrl to the page buffer group 120. The control circuit 110 may control the page buffer group 120 by providing the page buffer control signal PB_ctrl to the page buffer group 120.

The control circuit 110 may generate a voltage control signal V_ctrl based on the command signal CMD and may provide the voltage control signal V_ctrl to the voltage generation circuit 130. The control circuit 110 may control the voltage generation circuit 130 by providing the voltage control signal V_ctrl to the voltage generation circuit 130.

The control circuit 110 may generate a driving address signal ADD_d based on the address signal ADD and may provide the driving address signal ADD_d to the line driving circuit 140. The control circuit 110 may control the line driving circuit 140 by providing the driving address signal ADD_d to the line driving circuit 140.

The control circuit 110 may generate a plurality of switch control signals X_ctrlD, Y_ctrlD, X_ctrlW, and Y_ctrlW based on the address signal ADD and may provide the plurality of switch control signals X_ctrlD, Y_ctrlD, X_ctrlW, and Y_ctrlW to the plurality of switches 161, 162, 163, and 164. The control circuit 110 may control the plurality of switches 161, 162, 163, and 164 by providing the plurality of switch control signals X_ctrlD, Y_ctrlD, X_ctrlW, and Y_ctrlW to the plurality of switches 161, 162, 163, and 164.

As an embodiment, the control circuit 110 may include an address determination circuit 111. Based on the address signal ADD, the address determination circuit 111 may determine a drain selection line DSL(x) or DSL(y) that is connected to a selected memory string. The control circuit 110 may generate the plurality of switch control signals X_ctrlD, Y_ctrlD, X_ctrlW, and Y_ctrlW based on an determination result DSL(x) or DSL(y) and the address signal ADD. The address determination circuit 111 may include a decoder.

For example, when the address determination circuit 111 determines a drain selection line that is connected to a selected memory string as a first drain selection line DSL(x), the control circuit 110 may enable some switch control signals X_ctrlD and X_ctrlW, among the plurality of switch control signals X_ctrlD, Y_ctrlD, X_ctrlW, and Y_ctrlW. Furthermore, the control circuit 110 may selectively enable the switch control signals Y_ctrlW corresponding to a selected word line, among the remaining switch control signals Y_ctrlD and Y_ctrlW, based on the address signal ADD.

Furthermore, when the address determination circuit 111 determines a drain selection line that is connected to a selected memory string, among a plurality of memory strings, to be the first drain selection line DSL(x), the control circuit 110 may enable some switch control signals X_ctrlD and X_ctrlW, among the plurality of switch control signals X_ctrlD, Y_ctrlD, X_ctrlW, and Y_ctrlW. Furthermore, the control circuit 110 may selectively enable the switch control signals Y_ctrlW corresponding to a selected word line, among the remaining switch control signals Y_ctrlD and Y_ctrlW, based on the address signal ADD.

Furthermore, when the address determination circuit 111 determines a drain selection line that is connected to a selected memory string to be the second drain selection line DSL(y), the control circuit 110 may enable some switch control signals Y_ctrlD and Y_ctrlW, among the plurality of switch control signals X_ctrlD, Y_ctrlD, X_ctrlW, and Y_ctrlW. The control circuit 110 may selectively enable the switch control signals X_ctrlW corresponding to a selected word line, among the remaining switch control signals X_ctrlD and X_ctrlW, based on the address signal ADD.

Furthermore, when the address determination circuit 111 determines a drain selection line that is connected to a selected memory string, among a plurality of memory strings, as some (e.g., one) of the plurality of second drain selection lines DSL(y), the control circuit 110 may enable some switch control signals Y_ctrlD and Y_ctrlW, among the plurality of switch control signals X_ctrlD, Y_ctrlD, X_ctrlW, and Y_ctrlW. The control circuit 110 may selectively enable the switch control signals X_ctrlW corresponding to a selected word line, among the remaining switch control signals X_ctrlD and X_ctrlW, based on the address signal ADD.

The page buffer group 120 may include a plurality of page buffers PB1, PB2, . . . , and PBm (m is a natural number). The plurality of page buffers PB1, PB2 to PBm may be connected to a plurality of bit lines BL1, BL2, . . . , and BLm (m is a natural number), respectively. The plurality of page buffers PB1, PB2, . . . , and PBm may sense the values of data that has been stored in a memory cell, through a bit line based on the page buffer control signal PB_ctrl, and may output the sensed values as data DATA. Furthermore, the plurality of page buffers PB1, PB2, . . . , and PBm may receive data from an external device and may deliver the data to a memory cell, based on the page buffer control signal PB_ctrl.

The voltage generation circuit 130 may generate internal voltages V_int having various voltage levels based on the voltage control signal V_ctrl and may provide the internal voltages V_int to the line driving circuit 140. For example, the voltage generation circuit 130 may generate a selection word line driving voltage, a non-selection word line driving voltage, a drain selection line driving voltage, and a source selection line driving voltage based on the voltage control signal V_ctrl and may provide the generated driving voltages to the line driving circuit 140 as the internal voltages V_int. In this case, the selection word line driving voltage and the non-selection word line driving voltage may have different voltage levels.

The line driving circuit 140 may drive a plurality of lines DSL_g, WL_g, and SSL to the voltage level of the internal voltage V_int based on the driving address signal ADD_d. For example, the line driving circuit 140 may select at least one of a plurality of global drain selection lines DSL_g based on the driving address signal ADD_d and may drive a selected global drain selection line DSL_g to the voltage level of the drain selection line driving voltage. The line driving circuit 140 may select at least one of a plurality of global word lines WL_g based on the driving address signal ADD_d and may drive the selected global word line to the voltage level of the selection word line driving voltage. Furthermore, the line driving circuit 14 may drive non-selection global word lines that have been unselected, among a plurality of global word lines, to the voltage level of the non-selection word line driving voltage based on the driving address signal ADD_d. The line driving circuit 140 may select at least one of a plurality of source selection lines SSL based on the driving address signal ADD_d and may drive a selected source selection line SSL to the voltage level of the source selection line driving voltage. The line driving circuit 140 may include a decoder.

The first switches 161, among the plurality of switches 161, 162, 163, and 164, may electrically connect or disconnect the plurality of global drain selection lines DSL_g with or from a plurality of first local drain selection lines DSL(x) (hereinafter referred to as a "first drain selection line"). In this case, the first switches 161 may operate based on the first switch control signals X_ctrlD, among the plurality of switch control signals X_ctrlD, Y_ctrlD, X_ctrlW, and Y_ctrlW. For example, when the first switch control signals X_ctrlD are enabled, the first switches 161 may electrically connect the plurality of global drain selection lines DSL_g with the plurality of first drain selection lines DSL(x). When the first switch control signals X_ctrlD are disabled, the first switches 161 may electrically disconnect the plurality of global drain selection lines DSL_g from the plurality of first drain selection lines DSL(x).

The second switches 162, among the plurality of switches 161, 162, 163, and 164, may electrically connect or disconnect the plurality of global drain selection lines DSL_g with or from a plurality of second local drain selection lines DSL(y) (hereinafter referred to as a "second drain selection line"). In this case, the second switches 162 may operate based on the second switch control signals Y_ctrlD, among the plurality of switch control signals X_ctrlD, Y_ctrlD, X_ctrlW, and Y_ctrlW. For example, when the second switch control signals Y_ctrlD are enabled, the second switches 162 may electrically connect the plurality of global drain selection lines DSL_g with the plurality of second drain selection lines DSL(y). When the second switch control signals Y_ctrlD are disabled, the second switches 162 may electrically disconnect the plurality of global drain selection lines DSL_g from the plurality of second drain selection lines DSL(y).

The third switches 163, among the plurality of switches 161, 162, 163, and 164, may electrically connect or disconnect the plurality of global word lines WL_g with or from a plurality of local word lines WL (hereinafter referred to as a "word line"). In this case, the third switches 163 may operate based on the third switch control signals X_ctrlW, among the plurality of switch control signals X_ctrlD, Y_ctrlD, X_ctrlW, and Y_ctrlW. Furthermore, the third switches 163 may be disposed at locations corresponding to the first switches 161. For example, the first and third switches 161 and 163 may be disposed in a first direction (e.g., the left side) based on the memory cell array 150. When the third switch control signals X_ctrlW are enabled, the third switches 163 may electrically connect the plurality of global word lines WL_g with the plurality of word lines WL. When the third switch control signals X_ctrlW are disabled, the third switches 163 may electrically disconnect the plurality of global word lines WL_g from the plurality of word lines WL.

The fourth switches 164, among the plurality of switches 161, 162, 163, and 164, may electrically connect or disconnect the plurality of global word lines WL_g with or from the plurality of local word lines WL (hereinafter referred to as a "word line"). In this case, the fourth switches 164 may operate based on the fourth switch control signals Y_ctrlW, among the plurality of switch control signals X_ctrlD, Y_ctrlD, X_ctrlW, and Y_ctrlW. Furthermore, the fourth switches 164 may be disposed at locations corresponding to the second switches 162. For example, the second and fourth switches 162 and 164 may be disposed in a second direction (e.g., the right side) that is opposite to the first direction based on the memory cell array 150. When the fourth switch control signals Y_ctrlW are enabled, the fourth switches 164 may electrically connect the plurality of global word lines WL_g with the plurality of word lines WL. When the fourth switch control signals Y_ctrlW are disabled, the fourth switches 164 may electrically disconnect the plurality of global word lines WL_g from the plurality of word lines WL.

The memory cell array 150 may include a plurality of memory strings, each of which is connected between each of the plurality of bit lines BL1, BL2, . . . , and BLm (m is a natural number) and each of the plurality of source selection lines SSL. Each of the plurality of memory strings may include a drain selection transistor, a plurality of memory cells, and a source selection transistor. In this case, the plurality of memory strings that are included in the memory cell array 150 may be constructed like the memory strings as illustrated in FIG. 1.

The semiconductor device 100, according to an embodiment of the present disclosure, which is constructed as described above, may include the plurality of first drain selection lines DSL(x) and the plurality of second drain selection lines DSL(y), which are disconnected and connected to the memory cell array 150 in different directions. The semiconductor device 100 may drive at least one of the plurality of first drain selection lines DSL(x) or at least one of the plurality of second drain selection lines DSL(y). The semiconductor device 100 may select at least one of the plurality of word lines. The semiconductor device 100 may bidirectionally drive the selected word line and may unidirectionally drive the unselected word lines. For example, the semiconductor device may unidirectionally drive unselected word lines and bidirectionally drive a selected word line in the same direction as the direction in which the drain selection line DSL(x) or DSL(y) is driven.

An operation of the semiconductor device driving a word line according to an embodiment of the present disclosure is described in detail as follows.

The control circuit 110 may generate the voltage control signal V_ctrl, the driving address signal ADD_d, and the first to fourth switch control signals X_ctrlD, Y_ctrlD, X_ctrlW, and Y_ctrlW based on the command signal CMD and the address signal ADD.

Based on the voltage control signal V_ctrl, the voltage generation circuit 130 may generate the internal voltages V_int having voltage levels corresponding to the command signal CMD. For example, based on the voltage control signal V_ctrl, the voltage generation circuit 130 may generate a selection word line driving voltage, a non-selection word line driving voltage, a drain selection line driving voltage, and a source selection line driving voltage as the internal voltages V_int.

Based on the driving address signal ADD_d, the line driving circuit 140 may drive at least one of the plurality of global drain selection lines DSL_g to the voltage level of the drain selection line driving voltage. Based on the driving address signal ADD_d, the line driving circuit 140 may drive at least one of the plurality of global word lines to the voltage level of the selection word line driving voltage and may drive the remaining global word lines to the voltage level of the non-selection word line driving voltage. Based on the driving address signal ADD_d, the line driving circuit 140 may drive at least one of the plurality of source selection lines SSL to the voltage level of the source selection line driving voltage.

The address determination circuit 111 may determine a drain selection line that is selected in response to the address signal ADD, among the plurality of first drain selection lines DSL(x) and the plurality of second drain selection lines DSL(y).

When the address determination circuit 111 determines that a drain selection line that is selected in response to the address signal ADD has been included in the plurality of first drain selection lines DSL(x), the control circuit 110 may enable the first switch control signals X_ctrlD and the third switch control signals X_ctrlW. At this time, the control circuit 110 may enable a switch control signal corresponding to a global word line that is selected in response to the address signal ADD, among the fourth switch control signals Y_ctrlW.

The first switches 161 may electrically connect the plurality of global drain selection lines DSL_g with the plurality of first drain selection lines DSL(x) in response to the first switch control signals X_ctrlD that have been enabled.

The third switches 163 may electrically connect the plurality of global word lines WL_g with the plurality of word lines WL in response to the third switch control signals X_ctrlW that have been enabled.

For example, only a switch that is controlled by the third switch control signal X_ctrlW that has been enabled, among the third switches 163, may electrically connect the global word line WL_g with the word line WL. The remaining switches of the third switches 163 may electrically disconnect the global word lines WL_g from the word line WL.

The fourth switches 164 may electrically connect the plurality of global word lines WL_g with the plurality of word lines WL in response to the fourth switch control signals Y_ctrlW that have been enabled. For example, only a switch that is controlled by the fourth switch control signal Y_ctrlW that has been enabled, among the fourth switches 164, may electrically connect the global word line WL_g with the word line WL. The remaining switches of the fourth switches 164 may electrically disconnect the global word lines WL_g from the word line WL.

As a result, when a drain selection line that is selected in response to the address signal ADD is determined to be included in the plurality of first drain selection lines DSL(x), the semiconductor device according to an embodiment of the present disclosure may connect the plurality of global word lines WL_g with the plurality of word lines WL through the third switches 163. Furthermore, only a switch that is connected to a selected global word line, among the fourth switches 164, may connect a global word line with a word line.

Accordingly, the semiconductor device according to an embodiment of the present disclosure may unidirectionally drive unselected word lines and bidirectionally drive a selected word line in the same direction as a direction in which the first drain selection line is driven when a drain selection line that is selected in response to the address signal ADD is determined to be included in the plurality of first drain selection lines DSL(x).

When the address determination circuit 111 determines that a drain selection line that is selected in response to the address signal ADD has been included in the plurality of second drain selection lines DSL(y), the control circuit 110 may enable the second switch control signals Y_ctrlD and the fourth switch control signals Y_ctrlW. At this time, the control circuit 110 may enable a switch control signal corresponding to a global word line that is selected in response to the address signal ADD, among the third switch control signals X_ctrlW.

The second switches 162 may electrically connect the plurality of global drain selection lines DSL_g with the plurality of second drain selection lines DSL(y) in response to the second switch control signals Y_ctrlD that has been enabled.

Only a switch that is controlled by a third switch control signal that has been enabled, among the third switches 163, may electrically connect the global word line WL_g with the word line WL. The remaining switches of the third switches 163 may electrically disconnect the global word lines WL_g from the word line WL. That is, only a switch that is connected to a selected global word line, among the third switches 163, may connect a global word line with a word line. The remaining switches of the third switches 163 may disconnect the global word line from the word line.

The fourth switches 164 may electrically connect the plurality of global word lines WL_g with the plurality of word lines WL in response to the fourth switch control signals Y_ctrlW that has been enabled.

As a result, when a drain selection line that is selected in response to the address signal ADD is determined to be included in the plurality of second drain selection lines DSL(y), the semiconductor device according to an embodiment of the present disclosure may connect the plurality of global word lines WL_g with the plurality of word lines WL through the fourth switches 164. Furthermore, only a switch that is connected to a selected global word line, among the third switches 163, may connect a global word line with a word line.

Accordingly, the semiconductor device may unidirectionally drive unselected word lines and bidirectionally drive a selected word line in the same direction as a direction in which the second drain selection line is driven when a drain selection line that is selected in response to the address signal ADD is determined to be included in the plurality of second drain selection lines DSL(y).

A driving operation of a word line that is connected to a memory string included in the semiconductor device according to an embodiment of the present disclosure is described in detail as follows with reference to FIG. 3B. A (1-1)-th switch 161_1 illustrated in FIG. 3B may correspond to the first switches 161 in FIG. 3A. A (2-1)-th switch 162_1, illustrated in FIG. 3B, may correspond to the second switches 162 in FIG. 3A. A (3-1)-th switch 163_1, a (3-2)-th switch 163_2, and a (3-3)-th switch 163_3, illustrated in FIG. 3B, may correspond to the third switches 163 in FIG. 3A. A (4-1)-th switch 164_1, a (4-2)-th switch 164_2, and a (4-3)-th switch 164_3, illustrated in FIG. 3B, may correspond to the fourth switches 164 in FIG. 3A. Furthermore, signals or lines that are connected to switches, which are illustrated in FIG. 3B, along with the switches may correspond to the signals or lines illustrated in FIG. 3A.

The memory strings, illustrated in FIG. 3B, have the same connection relation as the memory strings illustrated in FIG. 1. Accordingly, only the connection relations of the switches 161_1, 162_1, 163_1, 163_2, 163_3, 164_1, 164_2, and 164_3 that are added are described.

Referring to FIG. 3B, the (1-1)-th switch 161__1 may 161_1 may electrically connect or disconnect a global drain selection line DSL_g<0> with or from the first drain selection line DSL(x) based on a first switch control signal X_ctrlD<0>.

The (2-1)-th switch 162_1 may electrically connect or disconnect the global drain selection line DSL_g<0> with or from the second drain selection line DSL(y) based on a second switch control signal Y_ctrlD<0>.

The (3-1)-th switch 1631 may electrically connect or disconnect a global word line WL_g<n+1> with or from a word line WL(n+1) based on a third switch control signal X_ctrlW<n+1>.

The (3-2)-th switch 163_2 may electrically connect or disconnect a global word line WL_g<n> with or from a word line WL(n) based on a third switch control signal X_ctrlW<n>.

The (3-3)-th switch 163_3 may electrically connect or disconnect a global word line WL_g<n−1> with or from a word line WL(n−1) based on a third switch control signal X_ctrlW<n−1>.

The (4-1)-th switch 164_1 may electrically connect or disconnect the global word line WL_g<n+1> with or from the word line WL(n+1) based on a fourth switch control signal Y_ctrlW<n+1>.

The (4-2)-th switch 164_2 may electrically connect or disconnect the global word line WL_g<n> with or from the word line WL(n) based on a fourth switch control signal Y_ctrlW<n>.

The (4-3)-th switch 164_3 may electrically connect or disconnect the global word line WL_g<n−1> with or from the word line WL(n−1) based on a fourth switch control signal Y_ctrlW<n−1>.

In this case, the (1-1)-th switch 161_1, the (2-1)-th switch 162_1, the (3-1)-th switch 163_1, the (3-2)-th switch 163_2, the (3-3)-th switch 163_3, the (4-1)-th switch 164_1, the (4-2)-th switch 164_2, and the (4-3)-th switch 164_3 may include transistors N1 to N8, respectively.

As illustrated in FIG. 3B, first and second drain selection transistors DST(x) and DST(y) may be connected to first and second drain selection lines DSL(x) and DSL(y), respectively, which are physically disconnected. First memory cells MC(x) and second memory cells MC(y) may be connected to the same word line WL(n+1) in common.

When the address determination circuit 111 determines that the first drain selection line DSL(x) is selected, the first switch control signal X_ctrlD<0> may be enabled, and the global drain selection line DSL_g<0> and the first drain selection line DSL(x) may be connected through the (1-1)-th switch 161_1. At this time, when the global drain selection line DSL_g<0> is driven to a driving voltage level, the first drain selection line DSL(x) may also be driven to the driving voltage level. At this time, when the first drain selection line DSL(x) that has been selected is driven to the driving voltage level, the second drain selection line DSL(y) that has not been selected may be driven to a ground level or a specific voltage level.

When the address determination circuit 111 determines that the first drain selection line DSL(x) is selected, the third switch control signals X_ctrlW<n+1>, X_ctrlW<n>, and X_ctrlW<n−1> may be enabled. The global word lines WL_g<n+1>, WL_g<n>, and WL_g<n−1> and the word lines WL(n+1), WL(n), and WL(n−1) may be connected through the (3-1)-th switch 163_1, the (3-2)-th switch 163_2, and the (3-3)-th switch 163_3. At this time, the word lines WL(n+1), WL(n), and WL(n−1) may also be driven to the driving voltage levels of the global word lines WL_g<n+1>, WL_g<n>, and WL_g<n−1>.

If it is assumed that the n-th global word line WL_g<n> has been selected and the remaining global word lines WL_g<n+1> and WL_g<n−1> have not been selected, the n-th word line WL(n) may be driven to the voltage level of the selection word line driving voltage, and the remaining word lines WL(n+1) and WL(n−1) may be driven to the voltage level of the non-selection word line driving voltage. Furthermore, the fourth switch control signal Y_ctrlW<n> may be enabled, and the remaining fourth switch control signals Y_ctlrW<n+1> and Y_ctrlW<n−1> may be disabled. Accordingly, the n-th global word line WL_g<n> and the n-th word line WL(n) may be connected through the (4-2)-th switch 164_2, and the n-th word line WL(n) may be driven to the voltage level of the driving word line voltage.

As a result, when the first drain selection line DSL(x) is selected, the memory string and the switches, illustrated in FIG. 3B, may unidirectionally drive unselected word lines in the same direction as the direction of the first drain selection line DSL(x) and may bidirectionally drive a selected word line regardless of the driving direction of the first drain selection line DSL(x) as in FIG. 2A.

When the address determination circuit 111 determines that the second drain selection line DSL(y) is selected, the second switch control signal Y_ctrlD<0> may be enabled, and the global drain selection line DSL_g<0> and the second drain selection line DSL(y) may be connected through the (2-1)-th switch 162_1. At this time, when the global drain selection line DSL_g<0> is driven to a driving voltage level, the second drain selection line DSL(y) may also be driven to the driving voltage level. At this time, when the second drain selection line DSL(y) that has been selected is driven to the driving voltage level, the first drain selection line DSL(x) that has not been selected may be driven to the ground level or a specific voltage level.

When the address determination circuit 111 determines that the second drain selection line DSL(y) is selected, the fourth switch control signal Y_ctrlW<n+1>, Y_ctrlW<n>, Y_ctrlW<n−1> may be enabled, and the global word lines WL_g<n+1>, WL_g<n>, and WL_g<n−1> and the word lines WL(n+1), WL(n), and WL(n−1) may be connected through the (4-1)-th switch 164_1, the (4-2)-th switch 164_2, and the (4-3)-th switch 164_3. At this time, the word lines WL(n+1), WL(n), and WL(n−1) may also be driven to the driving voltage levels of the global word lines WL_g<n+1>, WL_g<n>, and WL_g<n−1>.

If it is assumed that the n-th global word line WL_g<n> is selected and the remaining global word lines WL_g<n+1> and WL_g<n−1> have not been selected, the n-th word line WL(n) may be driven to the voltage level of the selection word line driving voltage, and the remaining word lines WL(n+1) and WL(n−1) may be driven to the voltage level of the non-selection word line driving voltage. Furthermore, the third switch control signal X_ctrlW<n> may be enabled, and the remaining third switch control signals X_ctlrW<n+1> and X_ctrlW<n−1> may be disabled. Accordingly, the n-th global word line WL_g<n> and the n-th word line WL(n) may be connected through the (3-2)-th switch 163_2, and thus, the n-th word line WL(n) may be driven to the voltage level of the driving word line voltage.

As a result, when the second drain selection line DSL(y) is selected, the memory string and the switches, illustrated in FIG. 3B, may unidirectionally drive unselected word lines in the same direction as the direction of the second drain selection line DSL(y) and may bidirectionally drive a selected word line regardless of the driving direction of the second drain selection line DSL(y) as in FIG. 2B.

Figure 4A:
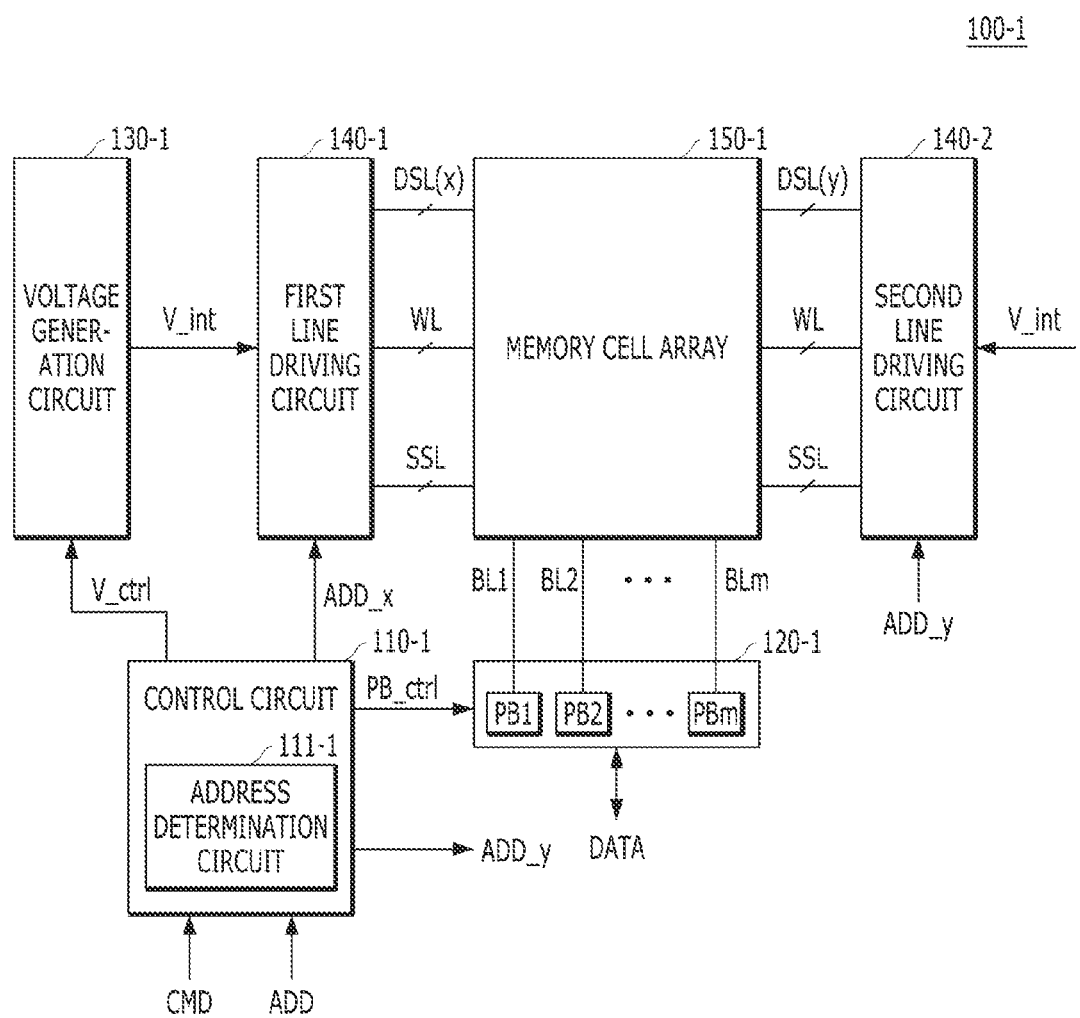
FIGS. 4A and 4B are schematic diagrams for describing a semiconductor device according to another embodiment to which a memory string according to an embodiment of the present disclosure has been applied.
Figure 4B:
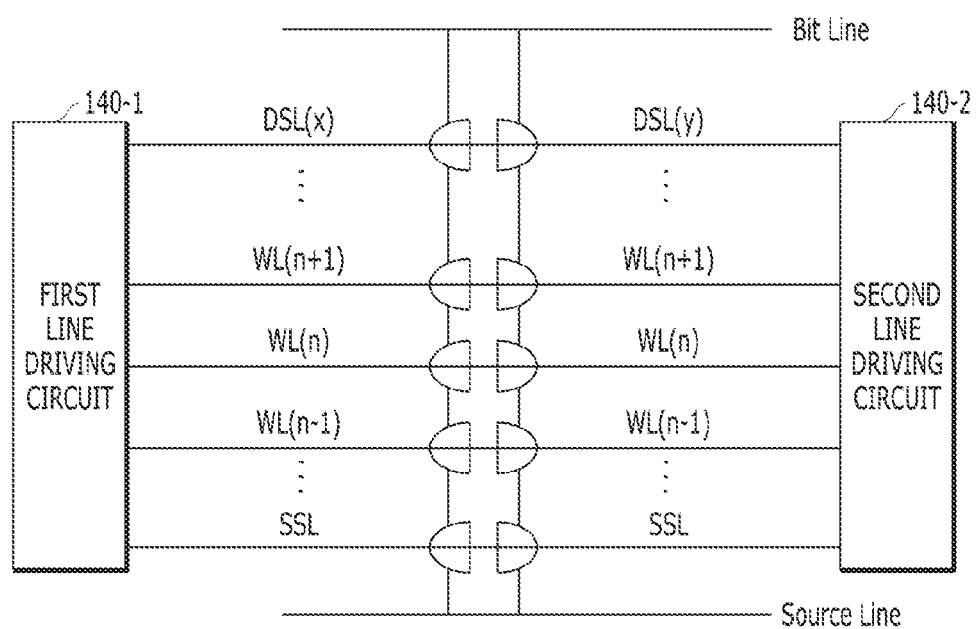

FIGS. 4A and 4B are schematic diagrams for describing a semiconductor device according to another embodiment to which a memory string according to an embodiment of the present disclosure has been applied.

Referring to FIG. 4A, a semiconductor device 100-1 according to another embodiment to which a memory string according to an embodiment of the present disclosure has been applied may include a control circuit 110-1, a page buffer group 120-1, a voltage generation circuit 130-1, a first line driving circuit 140-1, a second line driving circuit 140-2, and a memory cell array 150-1. In this case, the page buffer group 120-1, the voltage generation circuit 130-1, and the memory cell array 150-1, illustrated in FIG. 4A, have the same constructions as the page buffer group 120, the voltage generation circuit 130, and the memory cell array 150, illustrated in FIG. 3A, and descriptions thereof will be omitted.

The first line driving circuit 140-1 may be disposed in a direction corresponding to a first drain selection line DSL (x). For example, the first line driving circuit 140-1 may be disposed in the same direction as the direction of the first drain selection line DSL(x). The first line driving circuit 140-1 may drive the first drain selection line DSL(x), word lines WL, and a source selection line SSL based on a first driving address signal ADD_x. At this time, the first line driving circuit 140-1 may drive a selected word line and an unselected word line, among the word lines WL, to different voltage levels based on the first driving address signal ADD_x. Furthermore, the first line driving circuit 140-1 may drive only a selected word line WL, among the word lines WL, based on the first driving address signal ADD_x.

The second line driving circuit 140-2 may be disposed in a direction corresponding to a second drain selection line DSL(y). For example, the second line driving circuit 140-2 may be disposed in the same direction as the direction of the second drain selection line DSL(y). The second line driving circuit 140-2 may drive the second drain selection line DSL(y), the word lines WL, and the source selection line SSL based on a second driving address signal ADD_y. At this time, the second line driving circuit 140-2 may drive a selected word line and an unselected word line, among the word line WL, to different voltage levels based on the second driving address signal ADD_y. Furthermore, the second line driving circuit 140-2 may drive only a selected word line, among the word lines WL, based on the second driving address signal ADD_y.

The control circuit 110-1 may generate a page buffer control signal PB_ctrl, a voltage control signal V_ctrl, the first driving address signal ADD_x, and the second driving address signal ADD_y based on a command signal CMD and an address signal ADD.

The control circuit 110-1 may control the page buffer group 120-1, the voltage generation circuit 130-1, the first line driving circuit 140-1, and the second line driving circuit 140-2 by using the generated signals PB_ctrl, V_ctrl, ADD_x, and ADD_y. Accordingly, the control circuit 110-1 may program data into the memory cell array 150-1, or may erase data that has been programmed into the memory cell array 150-1.

The control circuit 110-1 may include an address determination circuit 111-1. Based on the address signal ADD, the address determination circuit 111-1 may determine the drain selection line DSL(x) or DSL(y) that is connected to a selected memory string. The address determination circuit 111-1 may include a decoder. The control circuit 110 may generate the first driving address signal ADD_x and the second driving address signal ADD_y based on the determination result DSL(x) or DSL(y) and the address signal ADD.

For example, when the determination result of the address determination circuit 111-1 indicates the first drain selection line DSL(x), the control circuit 110-1 may generate the first driving address signal ADD_x so that the first drain selection line DSL(x), the word lines WL, and the source selection line SSL are driven by the first line driving circuit 140-1. Furthermore, the control circuit 110-1 may generate the second driving address signal ADD_y so that a selected word line, among the word lines WL, and the source selection line SSL are driven by the second line driving circuit 140-2. Accordingly, the first line driving circuit 140-1 may drive both a selected word line and an unselected word line, and the second line driving circuit 140-2 may drive only a selected word line.

That is, when the determination result of the address determination circuit 111-1 indicates the first drain selection line DSL(x), the control circuit 110-1 may control the driving of an unselected word line to be performed only by the first line driving circuit 140-1.

When the first drain selection line DSL(x) is driven, the semiconductor device 100-1 according to another embodiment of the present disclosure may drive a selected word line and an unselected word line through the first line driving circuit 140-1 and may drive only a selected word line through the second line driving circuit 140-2.

As a result, when the first drain selection line DSL(x) is driven, the semiconductor device 100-1 may unidirectionally drive an unselected word line in the same direction as the direction of the first drain selection line DSL(x) and bidirectionally drive a selected word line.

When the determination result of the address determination circuit 111-1 indicates the second drain selection line DSL(y), the control circuit 110-1 may generate the second driving address signal ADD_y so that the second drain selection line DSL(y), the word lines WL, and the source selection line SSL are driven by the second line driving circuit 140-2. Furthermore, the control circuit 110-1 may generate the first driving address signal ADD_x so that a selected word line, among the word lines WL, and the source selection line SSL are driven by the first line driving circuit 140-1. Accordingly, the second line driving circuit 140-2 may drive both a selected word line and an unselected word line, and the first line driving circuit 140-1 may drive only a selected word line.

That is, when the determination result of the address determination circuit 111-1 indicates the second drain selection line DSL(y), the control circuit 110-1 may control the driving of an unselected word line to be performed only by the second line driving circuit 140-2.

When the second drain selection line DSL(y) is driven, the semiconductor device 100-1 may drive a selected word line and an unselected word line through the second line driving circuit 140-2, and may drive only a selected word line through the first line driving circuit 140-1.

As a result, the semiconductor device 100-1 may unidirectionally drive an unselected word line in the same direction as the direction of the second drain selection line DSL(y) and bidirectionally drive a selected word line, when the second drain selection line DSL(y) is driven.

A driving operation of a word line that is connected to a memory string included in a semiconductor device according to an embodiment of the present disclosure is described in detail with reference to FIG. 4B. The memory string illustrated in FIG. 4B has the same connection relation as the memory string illustrated in FIG. 1. Accordingly, only the connection relation of the first and second line driving circuits 140-1 and 140-2 is described.

Referring to FIG. 4B, the first line driving circuit 140-1 may be disposed in the same direction as the direction of the first drain selection line DSL(x), and may drive the first drain selection line DSL(x), word lines WL(n+1), WL(n), and WL(n−1), and the source selection line SSL, based on the first driving address signal ADD_x.

The second line driving circuit 140-2 may be disposed in the same direction as the direction of the second drain selection line DSL(y), and may drive the second drain selection line DSL(y), the word lines WL(n+1), WL(n), and WL(n−1), and the source selection line SSL, based on the second driving address signal ADD_y.

It may be assumed that the first drain selection line DSL(x) is driven by the first line driving circuit 140-1. In this case, it may be assumed that the n-th word line WL(n), among the word lines WL(n+1), WL(n), and WL(n−1), is selected and the (n+1)-th word line WL(n+1) and the (n−1)-th word line WL(n−1) are unselected.

The first line driving circuit 140-1 may drive, to different voltage levels, the n-th word line WL(n) that has been selected and the (n+1)-th word line WL(n+1) and the (n−1)-th word line WL(n−1) that have not been selected.

The second line driving circuit 140-2 may drive the n-th word line WL(n) that has been selected.

As a result, in a driving operation for a word line performed by a semiconductor device according to another embodiment of the present disclosure, when the first drain selection line DSL(x) is driven, the word lines WL(n+1) and WL(n−1) that have not been selected may be unidirectionally driven in the same direction as the direction of the first drain selection line DSL(x) through the first line driving circuit 140-1, and the word line WL(n) that has been selected may be bidirectionally driven through the first and second line driving circuits 140-1 and 140-2.

It may be assumed that the second drain selection line DSL(y) is driven by the second line driving circuit 140-2. In this case, it may be assumed that the n-th word line WL(n), among the word lines WL(n+1), WL(n), and WL(n−1), is selected and the (n+1)-th word line WL(n+1) and the (n−1)-th word line WL(n−1) are unselected.

The second line driving circuit 140-2 may drive, to different voltage levels, the n-th word line WL(n) that has been selected and the (n+1)-th word line WL(n+1) and the (n−1)-th word line WL(n−1) that have not been selected.

The first line driving circuit 140-1 may drive the n-th word line WL(n) that has been selected.

As a result, in a driving operation for a word line performed by a semiconductor device according to another embodiment of the present disclosure, when the second drain selection line DSL(y) is driven, the word lines WL(n+1) and WL(n−1) that have not been selected may be unidirectionally driven in the same direction as the direction of the second drain selection line DSL(y) through the second line driving circuit 140-2, and the word line WL(n) that has been selected may be bidirectionally driven through the first and second line driving circuits 140-1 and 140-2.

Figure 5:
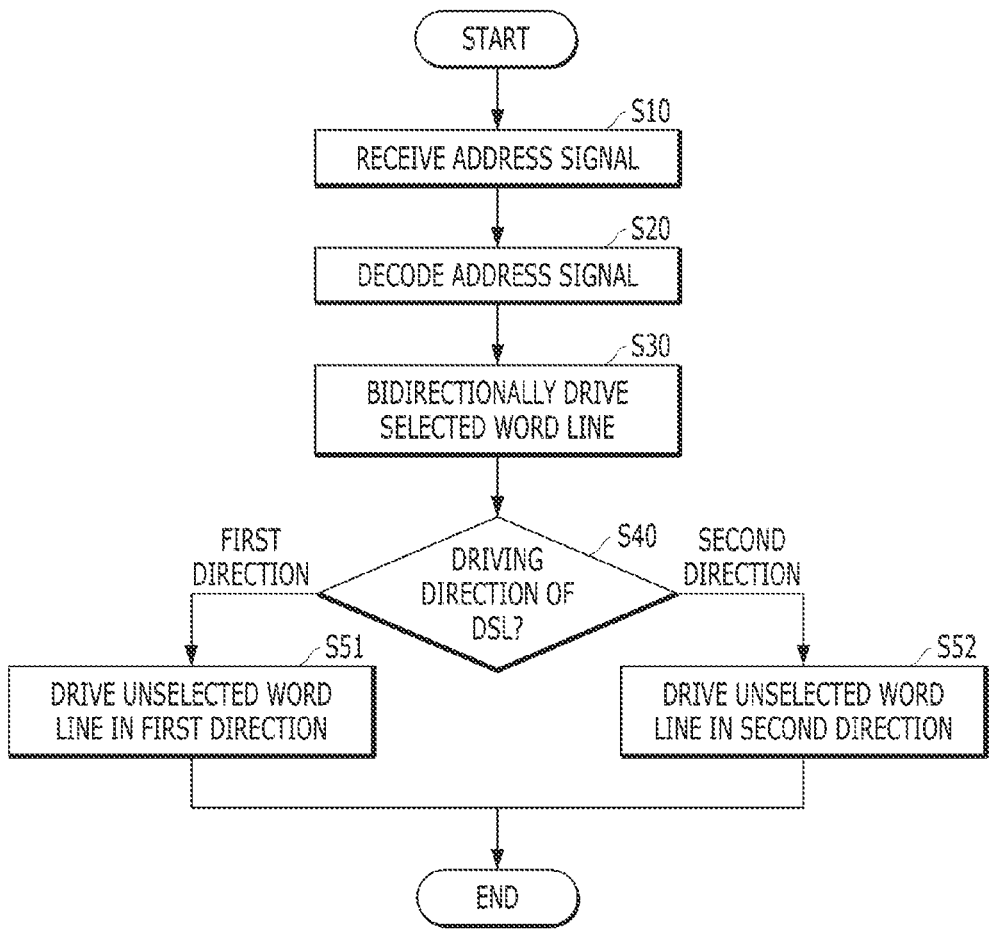
FIG. 5 is a flowchart for describing an operating method of a semiconductor device according to an embodiment of the present disclosure.

FIG. 5 is a flowchart for describing an operating method of a semiconductor device according to an embodiment of the present disclosure.

Referring to FIG. 5, the operating method of the semiconductor device according to an embodiment of the present disclosure may include an operation S10 of receiving an address signal, an operation S20 of decoding the address signal, an operation S30 of bidirectionally driving a selected word line, an operation S40 of determining a driving direction of a drain selection line, an operation S51 of driving an unselected word line in the first direction, and an operation S52 of driving the unselected word line in the second direction.

The operation S10 of receiving the address signal may include an operation of receiving, by the control circuit 110, the address signal from an external device (e.g., a host).

The operation S20 of decoding the address signal may include an operation of determining a selected word line and an unselected word line by decoding the address signal and an operation of determining the drain selection line DSL that has been selected. For example, the control circuit 110 may determine a selected word line and an unselected word line by decoding the address signal.

The operation S30 of bidirectionally driving the selected word line may include an operation of driving the selected word line in the first direction in which the first drain selection line DSL(x) is disposed and the second direction in which the second drain selection line DSL(y) is disposed. For example, referring to FIG. 3B, through the (3-2)-th switch 163_2 and the (4-2)-th switch 164_2, the n-th word line WL(n) that has been selected may be connected to the n-th global word line WL_g that has been selected. Accordingly, when the n-th global word line WL_g that has been selected is driven, the n-th word line WL(n) may be bidirectionally driven by the (3-2)-th switch 163_2 and the (4-2)-th switch 164_2. Furthermore, referring to FIG. 4B, the n-th word line WL(n) that has been selected may be bidirectionally driven by the first line driving circuit 140-1 and the second line driving circuit 140-2.

The operation S40 of determining the driving direction of the drain selection line may include an operation of determining a selected drain selection line by decoding the address signal. For example, it may be assumed that as in FIG. 1, the first drain selection line DSL(x) is disposed in the first direction, and the second drain selection line DSL(y) is disposed in the second direction. The address determination circuit 111 may determine that a selected drain selection line is driven in the first direction when the selected drain selection line is the first drain selection line DSL(x) by decoding the address signal. The address determination circuit 111 may determine that a selected drain selection line is driven in the second direction when the selected drain selection line is the second drain selection line DSL(y).

The operation S51 of driving the unselected word line in the first direction may be an operation that is performed when the driving direction of the drain selection line is determined as the "first direction" in the operation S40 of determining the driving direction of the drain selection line. For example, referring to FIG. 3B, the word lines WL(n+1) and WL(n−1) that have not been selected may be driven by the (3-1)-th switch 1631 and the (3-3)-th switch 1633 that are disposed in the first direction. Furthermore, referring to FIG. 4B, the word lines WL(n+1) and WL(n−1) that have not been selected may be driven by the first line driving circuit 140-1 that is disposed in the first direction.

The operation S52 of driving the unselected word line in the second direction may be an operation that is performed when the driving direction of the drain selection line is determined as the "second direction" in the operation S40 of determining the driving direction of the drain selection line. For example, referring to FIG. 3B, the word lines WL(n+1) and WL(n−1) that have not been selected may be driven by the (4-1)-th switch 164_1 and the (4-3)-th switch 164_3 that are disposed in the second direction. Furthermore, referring to FIG. 4B, the word lines WL(n+1) and WL(n−1) that have not been selected may be driven by the second line driving circuit 140-2 that is disposed in the second direction.

As described above, the operating method of the semiconductor device according to an embodiment of the present disclosure can match a driving direction of a drain selection line and a driving direction of an unselected word line, and can bidirectionally drive a selected word line regardless of the driving direction of the drain selection line.

Although embodiments according to the technical spirit of the present disclosure have been described above with reference to the accompanying drawings, the embodiments have been provided to merely describe embodiments according to the concept of the present disclosure, and the present disclosure is not limited to the embodiments. A person having ordinary knowledge in the art to which the present disclosure pertains may substitute, modify, and change the embodiments in various ways without departing from the technical spirit of the present disclosure written in the claims. Such substitutions, modifications, and changes may be said to belong to the scope of the present disclosure.

What is claimed is:

1. A semiconductor device comprising:
a memory cell array comprising a first memory string that is connected to a first drain selection line and a second memory string that is connected to a second drain selection line;
a control circuit configured to generate a first switch control signal and a second switch control signal based on an address signal;
a first switch disposed in a direction corresponding to the first drain selection line and configured to connect a global word line with one end of a local word line or disconnect the global word line from the one end of the local word line based on the first switch control signal; and
a second switch disposed in a direction corresponding to the second drain selection line and configured to connect the global word line with the other end the local word line or disconnect the global word line from the other end of the local word line based on the second switch control signal,
wherein the global word line is selected and driven or is unselected and driven, and the local word line is connected to the first memory string and the second memory string in common,
when the global word line is selected and driven, the first switch connects the global word line with the one end of the local word line and the second switch connects the global word line with the other end of the local word line.

2. The semiconductor device of claim 1, wherein the control circuit comprises an address determination circuit configured to determine a selected drain selection line, among the first and second drain selection lines, based on the address signal.

3. The semiconductor device of claim 2, wherein, when the global word line is unselected and driven, the control circuit enables a switch control signal that controls a switch in a direction corresponding to a drain selection line that is determined by the address determination circuit, among the first and second switch control signals.

4. The semiconductor device of claim 2, wherein, when the global word line is selected and driven, the control circuit enables the first and second switch control signals regardless of a drain selection line that is determined by the address determination circuit.

5. The semiconductor device of claim 3, wherein, when the global word line is unselected and driven and a drain selection line that is determined by the address determination circuit is the first drain selection line, the control circuit enables the first switch control signal.

6. The semiconductor device of claim 5, wherein, when the first switch control signal is enabled, the first switch connects the global word line with the local word line that are unselected and driven.

7. The semiconductor device of claim 3, wherein, when the global word line is unselected and driven and a drain selection line that is determined by the address determination circuit is the second drain selection line, the control circuit enables the second switch control signal.

8. The semiconductor device of claim 7, wherein, when the second switch control signal is enabled, the second switch connects the global word line with the local word line that are unselected and driven.

9. The semiconductor device of claim 4,
wherein, when the first switch control signal is enabled, the first switch connects the global word line with the local word line that are selected and driven, and
wherein, when the second switch control signal is enabled, the second switch connects the global word line with the local word line that are selected and driven.

10. A semiconductor device comprising:
a first line driving circuit configured to drive a word line based on a first driving address signal;
a second line driving circuit configured to drive the word line based on a second driving address signal;
a first memory string connected to a first drain selection line and the word line;
a second memory string connected to a second drain selection line and the word line; and
a control circuit configured to generate the first driving address signal and the second driving address signal based on an address signal,
wherein the first line driving circuit is configured to be connected to one of the word line and the second line driving circuit is configured to be connected to the other end of the word line,
wherein the word line is selected and driven by the first line driving circuit and the second line driving circuit.

11. The semiconductor device of claim 10, wherein, based on the first driving address signal and the second driving address signal, the first line driving circuit and the second line driving circuit unselect and drive or select and drive the word line, respectively.

12. The semiconductor device of claim 11, wherein the control circuit generates the first and second driving address signals so that one of the first and second line driving circuits unselects and drives the word line.

13. The semiconductor device of claim 11, wherein the control circuit generates the first and second driving address signals so that the first and second line driving circuits select and drive the word line.

14. The semiconductor device of claim 10,
wherein the first line driving circuit drives the first drain selection line, and
wherein the second line driving circuit drives the second drain selection line.

15. The semiconductor device of claim 14, wherein the control circuit comprises an address determination circuit configured to determine a selected drain selection line, among the first and second drain selection lines, based on the address signal.

16. The semiconductor device of claim 15, wherein the control circuit generates the first and second driving address signals so that one of the first and second line driving circuits that has driven a drain selection line determined by the address determination circuit, among the first and second line driving circuits, does not select and drives the word line.

* * * * *